United States Patent
Crean

(10) Patent No.: US 7,316,439 B1
(45) Date of Patent: Jan. 8, 2008

(54) SLIDE-OUT ROOM MECHANISM FOR RECREATIONAL VEHICLES

(76) Inventor: Johnnie R. Crean, 1612 S. Cucamonga Ave, Ontario, CA (US) 91761

(*) Notice: Subject to any disclaimer, the term of this patent is extended or adjusted under 35 U.S.C. 154(b) by 0 days.

(21) Appl. No.: 11/620,592

(22) Filed: Jan. 5, 2007

(51) Int. Cl.
*B60P 3/34* (2006.01)

(52) U.S. Cl. .................. 296/26.13; 296/171; 296/175; 52/67

(58) Field of Classification Search ........... 296/26.08, 296/26.09, 26.1, 26.11, 26.12, 26.13, 26.14, 296/26.15, 165, 171, 172, 173, 175, 176; 52/67
See application file for complete search history.

(56) References Cited

U.S. PATENT DOCUMENTS

| | | | | |
|---|---|---|---|---|
| 5,902,001 A | * | 5/1999 | Schneider | ................ 296/26.13 |
| 6,108,983 A | * | 8/2000 | Dewald et al. | ................. 52/67 |
| 6,202,362 B1 | * | 3/2001 | McManus et al. | ............. 52/67 |
| 6,402,216 B1 | * | 6/2002 | McManus et al. | ....... 296/26.14 |
| 6,619,713 B2 | * | 9/2003 | Eichhorn | ................ 296/26.01 |
| 6,619,714 B2 | * | 9/2003 | Schneider et al. | ....... 296/26.13 |
| 6,729,669 B2 | * | 5/2004 | McManus et al. | ....... 296/26.13 |

\* cited by examiner

*Primary Examiner*—Joseph D Pape
(74) *Attorney, Agent, or Firm*—Marc E. Hankin; Hankin Patent Law, APC

(57) ABSTRACT

This invention discloses a slide-out room mechanism for recreational vehicles that allows the smooth and stable contraction and extension of slide-out rooms while requiring a minimum of parts or modifications to the recreational vehicle chassis or stationary floor. The slide-out room mechanism includes one or more rollers which facilitate contraction and extension of the slide-out room. The slide-out room mechanism includes an inclined plane configured to roll upon the one or more rollers. The slide-out mechanism can also use electro-mechanical or other mechanisms to assist the rolling of the rollers and/or assist the extension and contraction of the slide-out room.

6 Claims, 6 Drawing Sheets

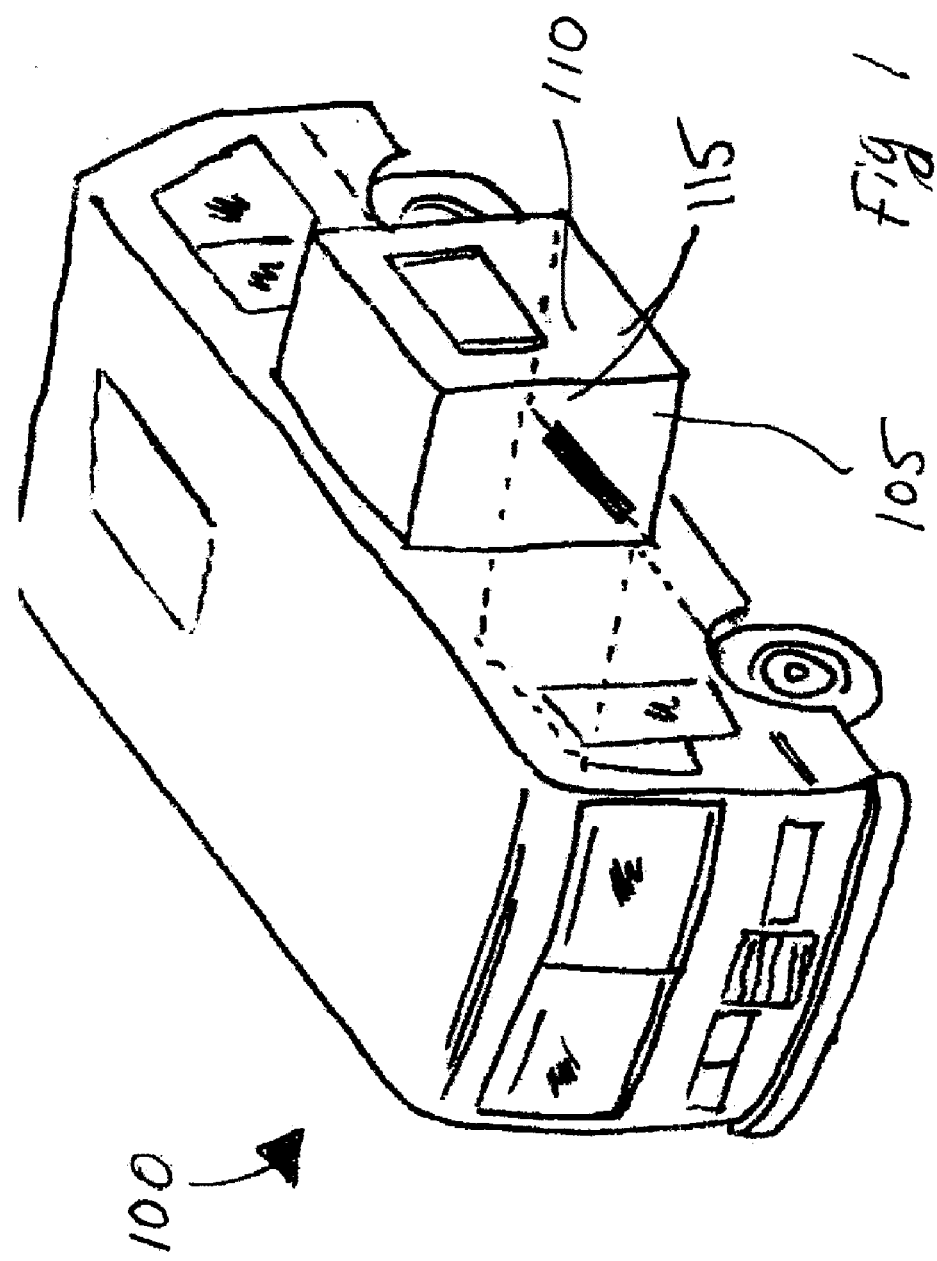

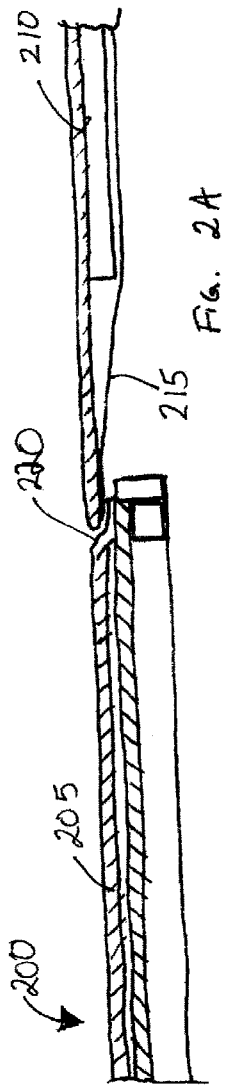
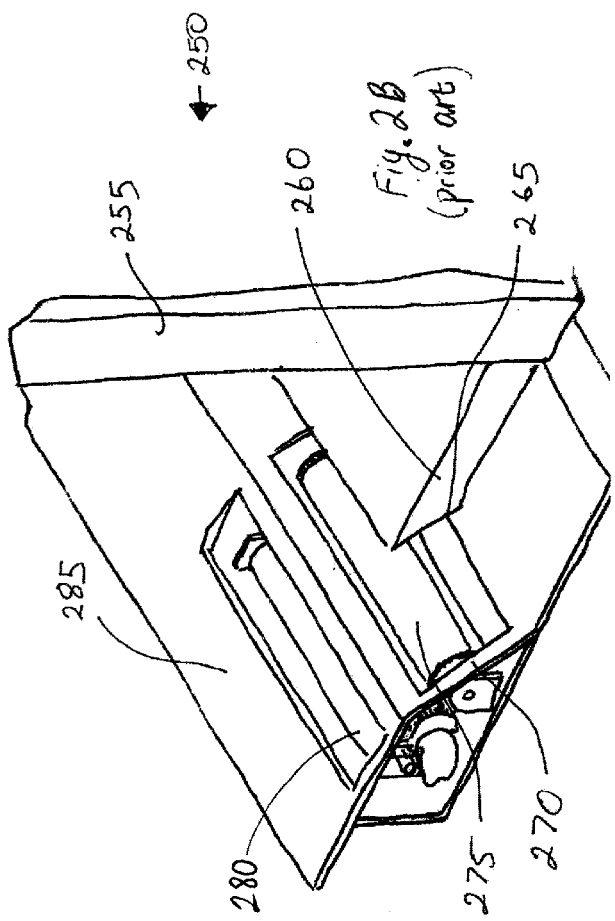
Fig. 2A (prior art)
Fig. 2B (prior art)

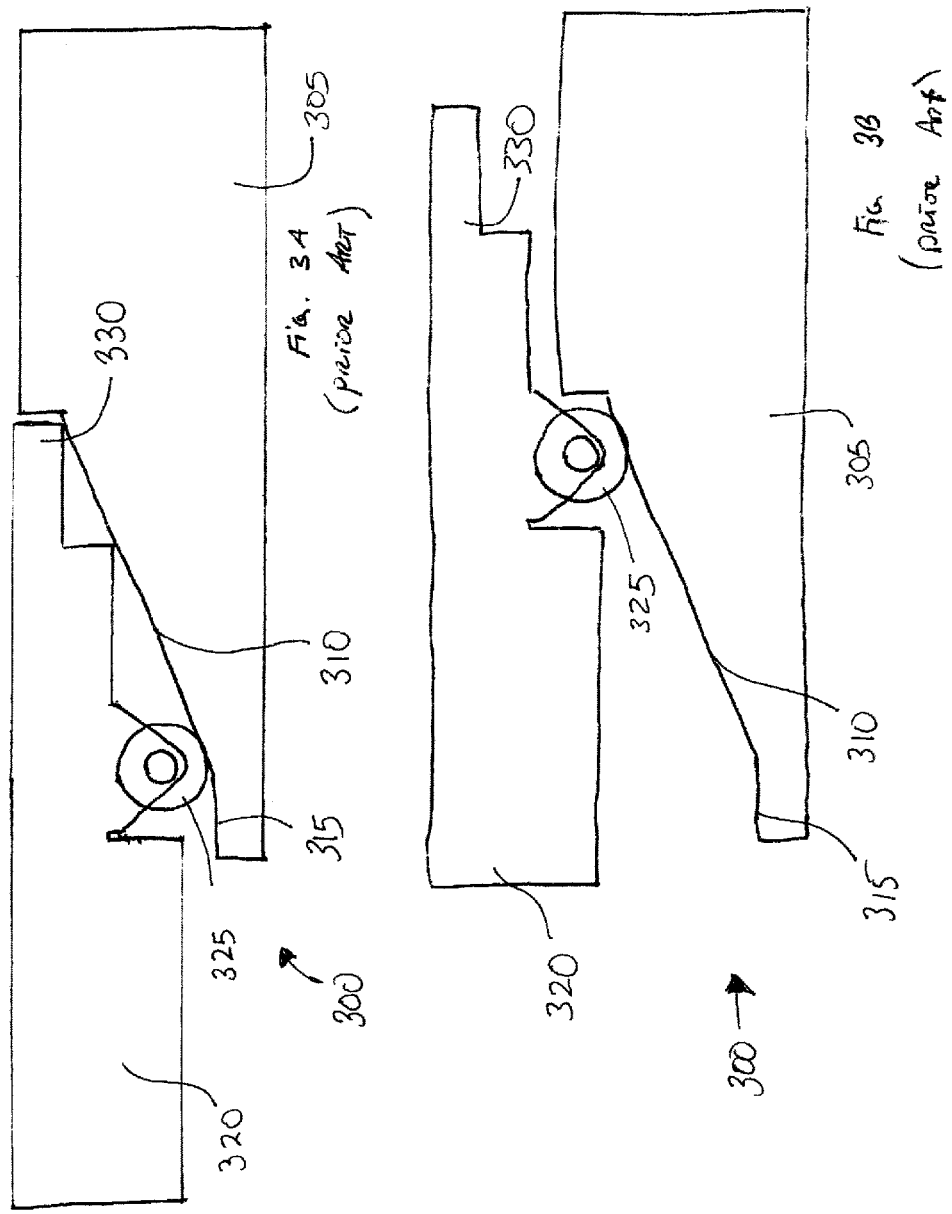

SLIDE-OUT ROOM MECHANISM FOR RECREATIONAL VEHICLES

FIELD OF INVENTION

This invention relates, generally, to extendable room mechanisms for recreational vehicles; more particularly, to extendable room mechanisms configured to allow efficient fabrication of extendable rooms that are highly usable both when contracted and extended.

BACKGROUND

Recreational vehicles commonly employ slide-out rooms to allow the recreational vehicle greater living space when parked. Throughout the development of the mechanisms for these slide-out rooms, designers have sought to improve slide-out designs by making the slide-out area of the vehicle highly usable both when contracted and extended, by designing stable slide-out rooms that contract and extend smoothly, and by designing rooms that can be fabricated with a minimum of parts, labor, and modifications to the chassis and floor of the recreational vehicle.

Several slide-out room designs employ a mechanism whereby the bottom surface of the slide-out is extended along the top surface of the vehicle to arrive at the extended position. For example, U.S. Pat. No. 5,902,001 to Schneider discloses a mechanism whereby the slide-out room extends along the stationary floor while attached to a pair of powered rails, which actuate the movement of the slide-out. Upon arriving at the fully extended position, the room is lowered along a first, short inclined-plane to its final position, having its floor lie flush with the stationary floor. On contraction, a mating, second inclined-plane on the slide-out room serves to lift the slide-out room along the first inclined-plane.

Another such mechanism is disclosed by U.S. Pat. No. 6,202,362 to McManus et al. The McManus mechanism, similarly, employs a system of dual, mating inclined-planes wherein the first inclined-plane is located at the edge of the stationary portion of floor and the second inclined-plane is located at the edge of the slide-out room floor. In McManus' disclosure, however, the inclined planes traverse a short vertical distance over a relatively long horizontal distance, thus, resulting in a smoother descent or ascent of the slide-out room. Also, the invention includes flat surfaces adjacent to each inclined-plane such that, when extended, the flat surface of the slide-out room lies upon the flat surface of the stationary room for support, thus, allowing for greater support of the slide-out room. The flat surface included with the slide-out room floor, however, is undesirable as it acts as a protruding "tongue" when the slide-out room is contracted.

Another such mechanism is disclosed by U.S. Pat. No. 6,402,216 to McManus et al., which discloses a slide-out room mechanism including a double inclined-plane attached to the slide-out room. By including a plane-on both lateral ends of the slide-out room, the device maintains the same slide-out room height when the room is contracted and when extended. The slide-out room is temporarily elevated while in the intermediate positions. Another mechanism, disclosed in U.S. Pat. No. 6,619,713 to Eichhorn, uses a flat, thin floor for the slide-out room that is not lowered when fully extended. Thus, the slide-out room remains at a constant height that is slightly higher than the stationary floor.

All of the above mechanisms, because they rely upon flat surfaces to slide upon and inclined places for elevating and lowering the slide-out room, fail to disclose a mechanism that is smooth and stable in its operation. Thus, another class of slide-out room mechanisms has been developed which employs rollers in order to facilitate the extending and contracting of the room.

One such mechanism is disclosed by U.S. Pat. No. 6,108,983 to Dewald, Jr. et al. Dewald's invention includes a floor which slides along the stationary floor and drops down a ramp to arrive at its extended position, flush with the stationary floor. Like many current systems, Dewald's invention uses a roller at the inward edge of the slide-out room floor to articulate along the surface of the stationary room floor. On being extended, the roller descends an incline-plane located at the outward edge of the stationary floor, in order to lower the slide-out room to its final position, which lies flush with the stationary floor. On contraction of the slide-out room, the wheel articulates along the incline-plane to ascend and return to its position, above the stationary floor. The inherent disadvantages of this and similar mechanism is that numerous cut outs and modifications must be made to the chassis of the stationary floor of the recreational vehicle in order to accommodate the inclined-plane and roller on the slide-out room floor.

Similarly, U.S. Pat. No. 6,619,714 to Schneider et al. discloses an elaborate mechanism employing rollers on the stationary floor of the recreational vehicle in order to facilitate the extension and contraction of the slide-out room. Again, like Dewald's disclosure above, this system requires numerous undesirable modifications to the chassis and stationary floor of the recreational vehicle as well as additional parts. The current state of the art in slide-out room mechanism is similar to the above devices and includes many of the above shortcomings because the rollers are placed floor of the sliding section.

One mechanism that improves upon these mechanisms is disclosed in U.S. Pat. No. 6,729,669 to McManus et al., which discloses a slide-out room mechanism wherein a pair of rollers are attached to the chassis and assist the slide-out room and assist the sliding of the room. This mechanism, however, also suffers from many of the shortcomings of the above inventions because the rolling mechanism is complex and requires many additional parts and modifications to the stationary floor in order to function. Specifically, the rolling mechanism in the patent is included as part of a lifting/lowering mechanism to raise the slide-out room to its contracted position. Thus, rather than reducing the number of parts and the complexity of the slide-out room mechanism, as is commonly desired by manufactures, the disclosed mechanism is quite complex.

Thus, there remains a long-felt need in the art for a slide-out room mechanism that provides smooth and stable operation while requiring a minimum of parts and modifications to the chassis and stationary floor of the recreational vehicle.

SUMMARY OF THE INVENTION

This invention is directed towards overcoming the above shortcomings by teaching a slide-out room mechanism that allows smooth and stable operation of the slide-out room while requiring a minimum of parts and modifications to the stationary floor and chassis of the recreational vehicle.

The invention improves upon the prior art by eliminating many of the undesirable features of the above inventions. First, the mechanism utilizes rollers, which improve the smoothness and efficiency of the mechanism compared to the mechanisms that rely upon friction slides. Second, the invention eliminates the need for extensive modifications to the stationary floor and chassis of the recreational vehicle by eliminating the inclined plane or ramp, commonly found on the stationary floors of the prior art inventions. Further, the disclosed improvements result in a drastic reduction in the number of parts and amount of labor required to manufacture the frame in which the slide-out mechanism is installed, thus resulting in much more efficient manufacture of the recreational vehicle. Finally, the invention eliminates the need for an undesirable, protruding "tongue" to be included on the interior edge of the slide-out room.

These and other improvements are achieved by modifying the slide-out mechanism at the floor of the slide-out room, the floor of the stationary room, and the chassis of the recreational vehicle. This mechanism is adaptable to all electromechanical, electro-hydraulic, electro-pneumatic, and other power drives known in the art, all varieties of recreational vehicles, and usable with a myriad of materials and configurations known in the art.

Unlike the above mechanisms, the exterior edge of the stationary floor in the invention does not feature an inclined-plane or ramp. Rather, the edge of the exterior edge of the stationary floor remains right-angled, as is commonly found on recreational vehicles not featuring slide-out rooms. Maintaining a right-angled edge offers several advantages to the recreational vehicle manufacturer. First, costly and time consuming modifications required to shape a ramp, included plane, or other shape at the edge are eliminated by the invention. Second, the slide-out room is adaptable to recreational vehicle chassis with a minimum of modifications to the chassis. Further, undesirable cut-outs are not required to the chassis and floor of the stationary portion of the recreational vehicle.

The invention also includes one or more fixed rollers located at the upper, exterior edge of the stationary floor of the recreational vehicle that are mounted to the edge of the stationary floor. The center axis of the roller(s) lie within the plane of the stationary floor. The roller(s) are of sufficiently large diameter such that the circumferential edge(s) of the roller(s) protrude beyond the plane of the stationary floor, such that the edge(s) of the roller(s) are exposed above and laterally outwards beyond the stationary floor.

The roller(s) may be made from any of the numerous materials known in the art for their manufacture and may feature bearings or other appurtenances to assist in their operation. The roller(s) can also feature placement or appurtenances such that they are hidden from plain sight or touch of the recreational vehicle passengers. The roller(s) may also be connected by a gear, belt, or chain drive to the electro-mechanical mechanism used to extend and contract the slide-out room.

In conjunction with the above improvements, as part of the invention, the floor of the slide-out room is also modified in order to improve the operation of the slide-out mechanism. The bottom of the slide-out room floor features an inclined-plane or ramp at its interior edge, which rides on the roller(s) such that, as the room is extended, the room is lowered. The remainder of the slide-out room floor remains, generally, flat. When the room reaches its fully-extended position, the slide-out room floor reaches a position where it becomes flush with the stationary floor. On the other hand, when the room is fully contracted, the slide-out room floor is raised over the stationary floor by the roller(s) and inclined-plane. It should be noted that, unlike the McManus '669 patent discussed above, no lifting mechanism is required in order to achieve the raising of the slide-out room over the stationary floor. Further, much fewer and less complex parts are required than the McManus invention. In one embodiment of the invention, the slide-out room is raised by the inclined-plane which rides on the roller to its higher position as it is contracted. The inclined-plane on the bottom of the slide-out room floor can be configured to be smoothly sloping, such that the change in slide-out room elevation is made as gradually and smoothly as possible.

In summary, the invention discloses a slide-out mechanism that improves upon many of the shortcomings of the prior art. In so doing, a slide-out mechanism is disclosed which allows the smooth and stable contraction and extension of the slide-out room while requiring a minimum of parts and modifications to the chassis and stationary floor of the recreational vehicle.

It should be noted that, in the interests of clarity, numerous details for the functionality of the slide-out room mechanism and variations on the configuration of the slide-out room mechanism are not included in this disclosure. Nevertheless, these details are known within the art and the variations remain within the contemplation of this invention.

BRIEF DESCRIPTION OF THE DRAWINGS

FIG. 1 is an illustration from perspective view of a recreational vehicle featuring a slide-out room.

FIG. 2A is an illustration from a cross-sectional view of a prior art slide-out room mechanism.

FIG. 2B is an illustration from perspective view of a prior art slide-out room mechanism.

FIG. 3A is an illustration from a cross-sectional view of a prior art slide-out room mechanism while the room is in an extended position.

FIG. 3B is an illustration from a cross-sectional view of a prior art slide-out room mechanism while the room is in a contracted position.

DETAILED DESCRIPTION OF THE DRAWINGS

Figure 4:
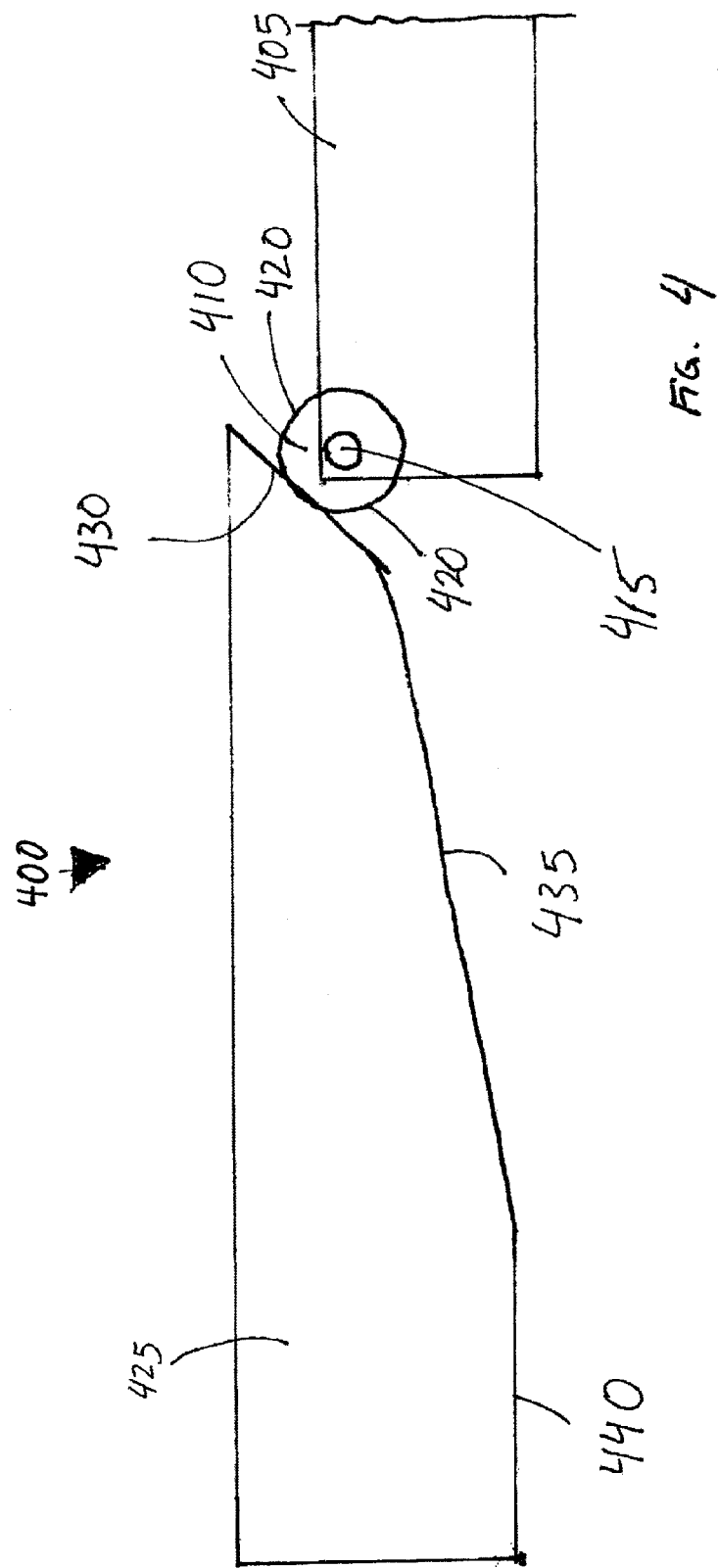
FIG. 4 is an illustration from a cross-sectional view of one embodiment of the invention.

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

In the following description, certain terminology is used to describe certain features of one or more embodiments of the invention. For instance, "recreational vehicle" refers to motorhomes, toy-box trailers, fifth wheel trailers, towable trailers, truck campers, folding trailers, van conversions, and further such vehicles known in the art; "roller" refers to any of the various cylindrical or spherical devices that roll or rotate.

FIG. 1 is an illustration from perspective view of a recreational vehicle 100 featuring a slide-out room 105. A recreational vehicle 100 is shown featuring a slide-out room 105 that is in the extended position. The walls 115 and floor 110 of the slide-out room are also illustrated in the figure.

FIG. 2A is an illustration from a cross-sectional view of a prior art slide-out room mechanism 200. A slide-out room mechanism 200 is shown along with its constituent parts, including the stationary floor section 205 and the sliding floor 210. The sliding floor in this particular configuration features a first inclined plane 215, which is configured to slide along a second inclined plane 220 at the exterior edge of the stationary floor section 205.

FIG. 2B is an illustration from perspective view of a prior art slide-out room mechanism 250. A slide-out room mechanism 250 is shown along with its constituent parts, including a slide-out room 255 with slide-out floor 260. The inside edge of the slide-out room floor 260 in this configuration features an inclined plane 265, which is configured to slide along rollers 275 and 280 as well as an inclined plane 270 on the stationary floor 285. Two separate rollers 275 and 280 along with a raising/lowering mechanism are required in this configuration to facilitate the extension and contraction of the slide-out room 255.

FIG. 3A is an illustration from a cross-sectional view of a prior art slide-out room mechanism 300 while the room is in an extended position. A slide-out room mechanism 300 is shown along with its constituent parts, including the stationary floor 305 and the sliding floor 320. In this configuration, the sliding floor 320 features one or more rollers 325, which roll along an inclined plane 310 on the stationary floor 305. The stationary floor 305 further features a flat section 315, which supports the sliding floor 320 when the sliding floor 320 reaches the fully extended position. In this configuration, a "tongue" 330 extends to the far edge of the sliding floor 320, such that the tongue 330 is approximately flush with the stationary floor 305 when the slide-out room mechanism 300 is fully extended.

FIG. 3B is an illustration from a cross-sectional view of a prior art slide-out room mechanism while the room is in a contracted position. A slide-out room mechanism 300 is shown along with its constituent parts, including the stationary floor 305 and the sliding floor 320. In this configuration, the sliding floor 320 features one or more rollers 325, which roll along an inclined plane 310 on the stationary floor 305. The stationary floor 305 further features a flat section 315, which supports the sliding floor 320 when the sliding floor 320 reaches the fully extended position. In this configuration, a "tongue" 330 extends over the stationary floor 305 of the slide-out room mechanism 300 when the room is in a contracted position.

FIG. 4 is an illustration from a cross-sectional view of one embodiment of the invention. A slide-out room mechanism 400 is illustrated along with its constituent parts, including the stationary floor 405, one or more rollers 410, and the sliding floor 425. The slide-out room mechanism 400 is configured such that the center axis 415 of the one or more rollers 410 is positioned at the outer edge of the stationary floor 405. The circumferential edge 420 of each of the one or more rollers 410 extends beyond the plane of the stationary floor 405 such that the circumferential edge(s) 420 extend both above and laterally outwards from the plane of the stationary floor 405. The sliding floor 425 of the slide-out room mechanism 400 features an inclined plane 430 which abuts and rolls against the one or more rollers 410 as the slide-out room is extended and contracted. The inclined plane 430 can include a gradual slope 435 prior to reaching its end, at the flat, bottom surface 440 of the sliding floor 425.

Figure 5:
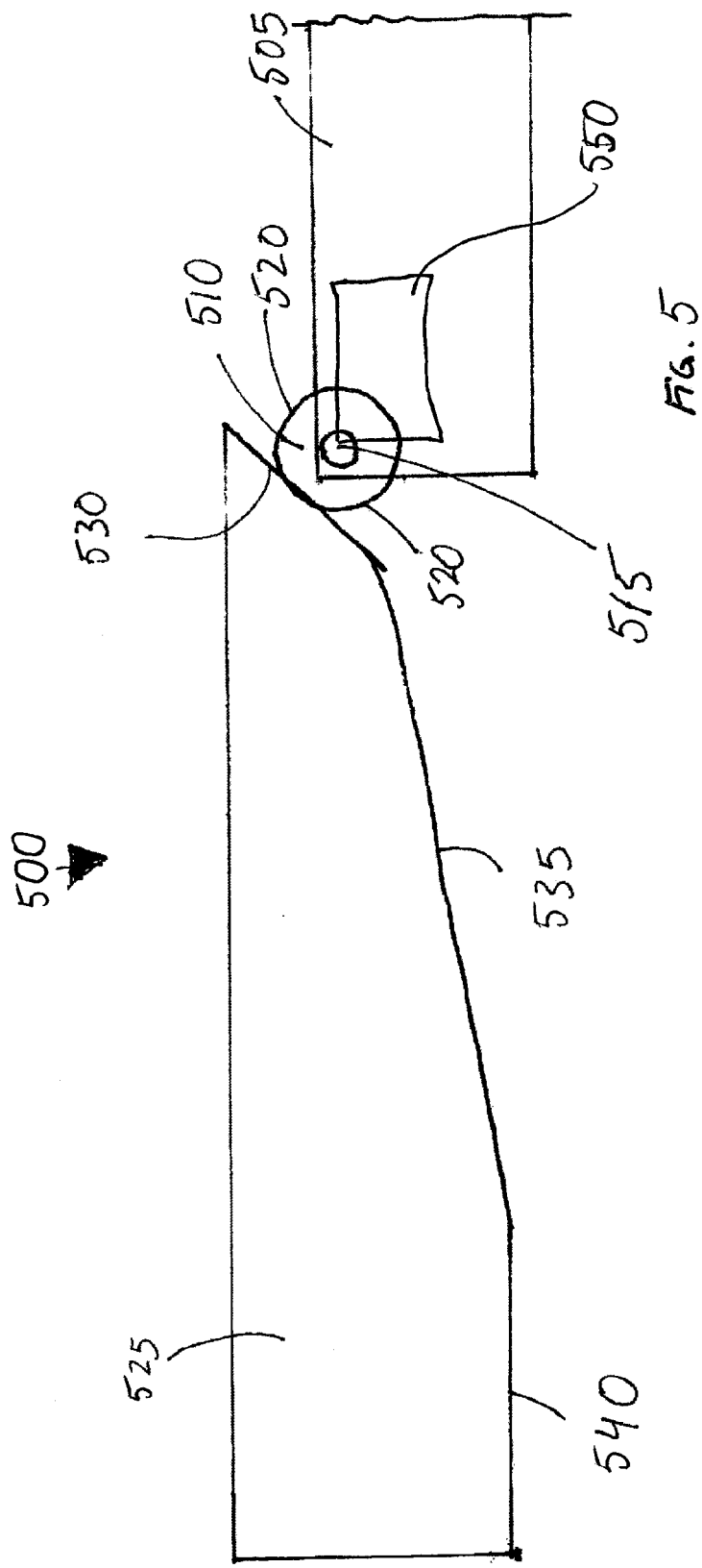
FIG. 5 is an illustration from a cross-sectional view of another embodiment of the invention.

FIG. 5 is an illustration from a cross-sectional view of another embodiment of the invention. A slide-out room mechanism 500 is illustrated along with its constituent parts, including the stationary floor 505, one or more rollers 510, and the sliding floor 525. The slide-out room mechanism 500 is configured such that the center axis 515 of the one or more rollers 510 is positioned at the outer edge of the stationary floor 505. The circumferential edge 520 of each of the one or more rollers 510 extends beyond the plane of the stationary floor 505 such that the circumferential edge(s) 520 extend both above and laterally outwards from the plane of the stationary floor 505. The sliding floor 525 of the slide-out room mechanism 500 features an inclined plane 530 which abuts and rolls against the one or more rollers 510 as the slide-out room is extended and contracted. The inclined plane 530 can include a gradual slope 535 prior to reaching its end, at the flat, bottom surface 540 of the sliding floor 525. The one or more rollers 510 can be powered to assist their rolling motion. Mechanism 550 is connected to the one or more rollers 510 to power the one or more rollers 510. Mechanism 550 can be connected by a gear, belt, chain drive, or other connector known in the art. Mechanism 550 can be an electromechanical mechanism for providing rolling power.

Figure 6:
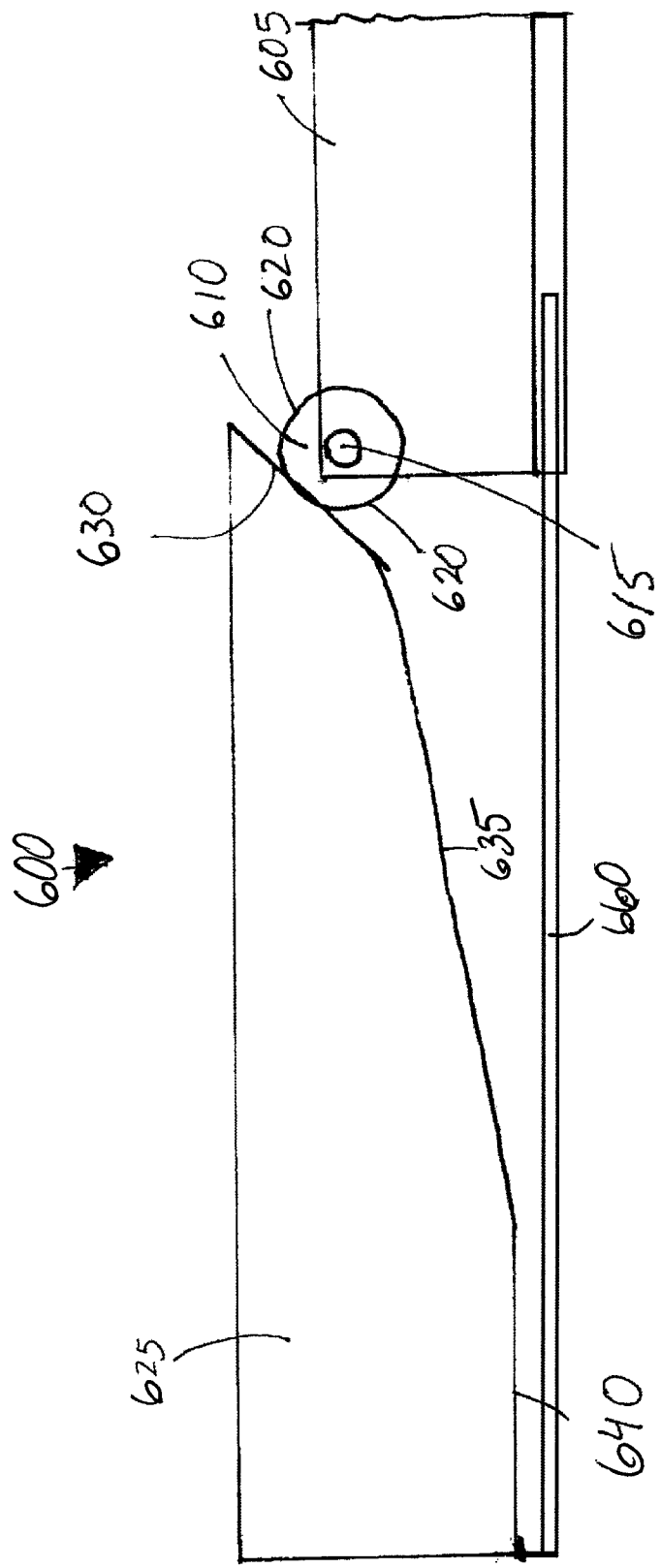
FIG. 6 is an illustration from a cross-sectional view of yet another embodiment of the invention.

FIG. 6 is an illustration from a cross-sectional view of yet another embodiment of the invention. A slide-out room mechanism 600 is illustrated along with its constituent parts, including the stationary floor 605, one or more rollers 610, and the sliding floor 625. The slide-out room mechanism 600 is configured such that the center axis 615 of the one or more rollers 610 is positioned at the outer edge of the stationary floor 605. The circumferential edge 620 of each of the one or more rollers 610 extends beyond the plane of the stationary floor 605 such that the circumferential edge(s) 620 extend both above and laterally outwards from the plane of the stationary floor 605. The sliding floor 625 of the slide-out room mechanism 600 features an inclined plane 630 which abuts and rolls against the one or more rollers 610 as the slide-out room is extended and contracted. The inclined plane 630 can include a gradual slope 635 prior to reaching its end, at the flat, bottom surface 640 of the sliding floor 625. Sliding floor 625 can be extended by a mechanism. Mechanism 660 connects to the sliding floor 625 and extends and contracts the sliding floor 625. Mechanism 660 can be an electromechanical mechanism, an electro-hydraulic mechanism, an electro-pneumatic mechanism, or other mechanism known in the art.

What is claimed is:

1. An extendable room mechanism for recreational vehicles, comprising:
   a stationary floor fixed to a chassis of the recreational vehicle,
   one or more rollers, said one or more rollers being rotatably attached to said stationary floor,
   said one or more rollers being configured such that a center axis of each of said one or more rollers lies within a plane of said stationary floor and said one or more rollers are further configured such that a circumferential edge of each of said one or more rollers lies beyond the plane of said stationary floor such that each circumferential edge extends vertically above and laterally beyond an edge of said stationary floor,
   a sliding floor, said sliding floor being configured such that said sliding floor connects slidably to the recreational vehicle and, in a contracted position, can slide over said stationary floor and, in an extended position, can extend laterally outwards from said stationary floor,
   said sliding floor being further configured such that an interior edge of said sliding floor features an inclined plane,
   said inclined plane being configured such that an innermost area of said sliding floor comprises a steepest sloping portion of said inclined plane and said inclined plane being further configured such that a slope of said inclined plane decreases in steepness away from the innermost area, and said inclined plane being configured such that said inclined plane rolls upon said rollers as the extendable room is extended and contracted.

2. An extendable room mechanism for recreational vehicles according to claim 1, wherein said inclined plane is configured such that said sliding floor will reach a height approximately level with the height of the stationary floor when said sliding floor is extended.

3. An extendable room mechanism for recreational vehicles according to claim 1, wherein said one or more rollers are powered by an electromechanical mechanism such that rolling of said rollers is assisted by said electromechanical mechanism.

4. An extendable room mechanism for recreational vehicles according to claim 1, wherein said sliding floor is extended and contracted by an electromechanical mechanism connected to said sliding floor.

5. An extendable room mechanism for recreational vehicles according to claim 1, wherein said sliding floor is extended and contracted by an electro-hydraulic mechanism connected to said sliding floor.

6. An extendable room mechanism for recreational vehicles according to claim 1, wherein said sliding floor is extended and contracted by an electro-pneumatic mechanism connected to said sliding floor.

* * * * *